Figure 1:
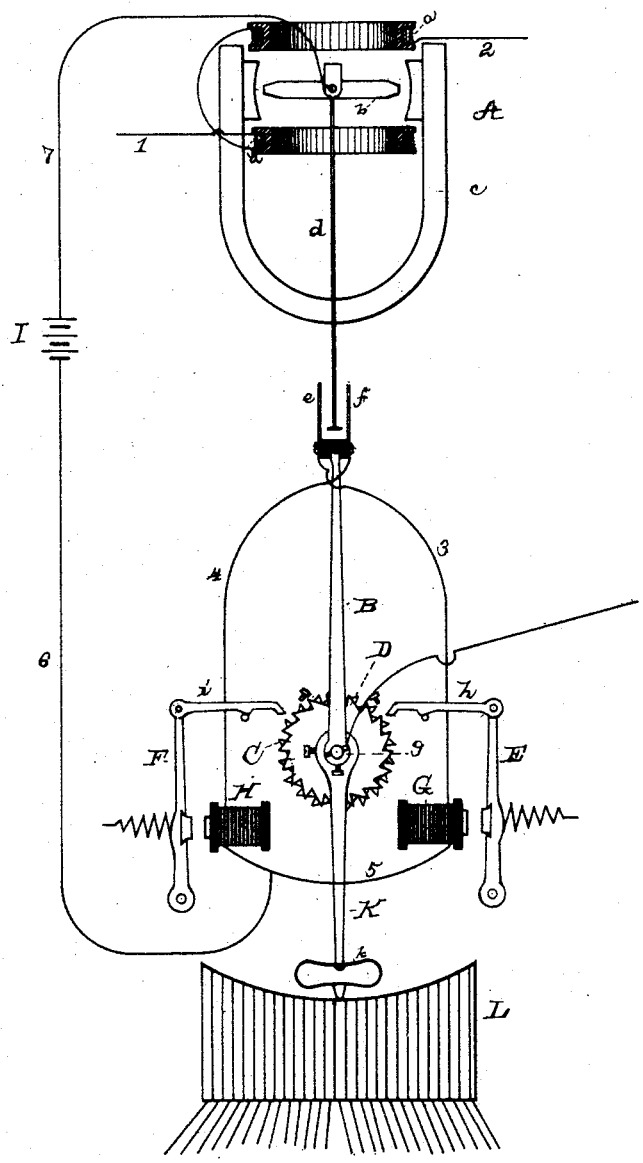

(No Model.)

2 Sheets—Sheet 1.

T. A. EDISON.
ELECTRIC REGULATOR.

No. 287,511. Patented Oct. 30, 1883.

ATTEST:
E. C. Rowlands
H. W. Seely

INVENTOR:
Thomas A. Edison,
By Rich'd N. Dyer,
Atty

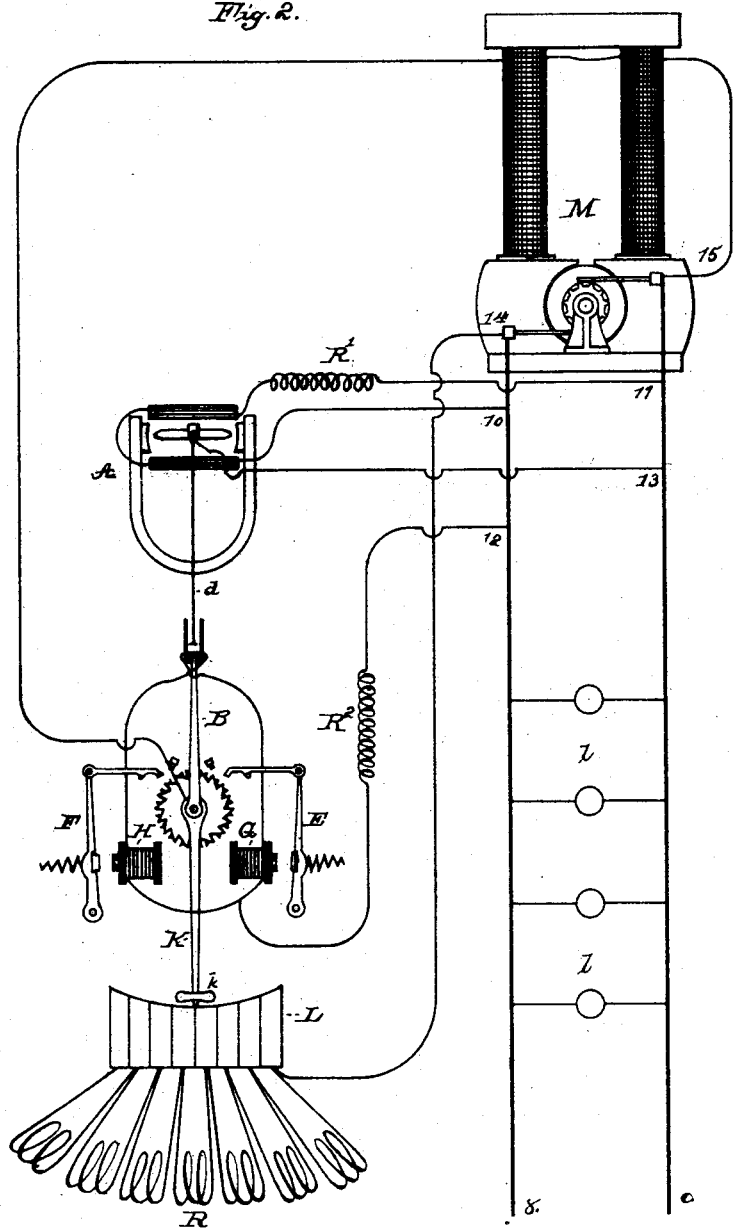

UNITED STATES PATENT OFFICE.

THOMAS A. EDISON, OF MENLO PARK, NEW JERSEY.

ELECTRIC REGULATOR.

SPECIFICATION forming part of Letters Patent No. 287,511, dated October 30, 1883.

Application filed June 29, 1883. (No model.)

*To all whom it may concern:*

Be it known that I, THOMAS A. EDISON, of Menlo Park, in the county of Middlesex and State of New Jersey, have invented a new and useful Improvement in Electrical Regulators, (Case No. 583,) of which the following is a specification.

The object I have in view is to obtain simple and efficient means for producing movement by variations in the electro-motive force of the current of an electrical circuit, which means will be exceedingly sensitive in their action, responding with great exactness to the variations in the electro-motive force of the current; and my object herein is more especially to provide simple, efficient, and sensitive means for regulating, automatically, the electro-motive force of one or more dynamo or magneto electric machines, and particularly when such a machine is used to supply incandescing electric lamps arranged in multiple arc. This I accomplish by the employment of a galvanometer the coils of which are located in the circuit, the variations of whose current are utilized to set the moving devices in action, and the bar or needle of which carries an arm making and breaking circuit at moving contacts. The galvanometer-arm closes at the moving contacts circuits to devices which move such contacts in the same direction as the galvanometer-arm, but away from the same, breaking contact with such arm, which continues to follow up the contact and make the circuit after each break until the entire deflection in that direction due to the variation in the current is accomplished. The reverse movement of the galvanometer-arm produces a movement of the contacts in the opposite direction. These contacts are preferably two springs carried by an insulating-head mounted upon a pivoted arm. The end of the galvanometer-arm plays freely between these springs. The arm carrying the contacts is secured to a shaft on which are mounted two ratchet-wheels with teeth turned in opposite directions. Pawls carried by armature-levers work in the teeth of these ratchet-wheels. The coils of the electro-magnets operating these armatures are in circuit each with one of the spring-contacts. The other ends of the coils of these two magnets are connected together and form one side of a local circuit, the other side of which extends to the galvanometer-arm. By this arrangement a positive motion can be obtained, corresponding closely to the sensitive movement of the galvanometer-arm, without destroying the sensitiveness of such galvanometer by any unusual friction opposing its movement. The particular use herein explained to which this movement is applied is that for regulating the electro-motive force of one or more dynamo or magneto electric machines; but the movement may also be applied to various other uses—as, for instance, to the operation of electrical meters; but, although such other uses are included in the broad scope of this invention, they are not herein specifically claimed, such specific matter being reserved for protection by other patents.

In the application of the devices described to the regulation of dynamo or magneto electric machines, the coils of the galvanometer are located in circuit from the machine. If the machine is employed to supply incandescing electric lamps arranged in multiple arc, the galvanometer-coils are located in a multiple-arc circuit with or without extra resistance, as desired, so that such coils will be affected the same as any one of the lamps by variations in the electro-motive force of the current, caused either by changes in the number of translating devices or in the speed of the engine. The local circuit closed by the galvanometer-arm may be supplied by a galvanic battery, or be a multiple-arc or other circuit from the conductors supplied by the machine, it being only necessary that sufficient current should be supplied to work the magnets. The shaft of the ratchet-wheels is provided with a second arm, which makes contact with the vertical plates of a resistance-commutator, and by moving thereon throws resistance into and out of the field-circuit of the machine.

In the accompanying drawings, forming a part hereof, Figure 1 is a separate view, partly diagrammatic, of the apparatus; and Fig. 2, a view partly diagrammatic, showing the apparatus applied to the regulation of a dynamo-electric machine.

With reference more especially to Fig. 1,

A is a galvanometer of any suitable construction, having coils a arranged in circuit 1 2. In the galvanometer shown a soft-iron needle or bar, b, is used, pivoted between the poles of a permanent magnet, c; but the constant field of the galvanometer may be produced by a coil of wire or in any other well-known way. The arm d projects from the pivoted bar b, and plays freely at its ends between contact-springs e f, carried by an insulating-head on an arm, B. This arm is secured to a shaft g, to which are also secured two ratchet-wheels, C D, with teeth turned in opposite directions, as shown. Pawls h i, carried by armature-levers E F, work in the teeth of wheels C D, and these armature-levers are drawn forward by electro-magnets G H, and are retracted by springs. One end of the coils of G is connected with e by wire 3, while one end of the coils of H is connected with f by wire 4. The other ends of the coils of these two magnets are connected together by wire 5 and to a local battery, I, or other source of electrical energy by wire 6. The other pole of I is connected by wire 7 to the pivot of the bar or needle b. Movement will be produced in the manner already explained. The shaft g will preferably be arranged in line with the pivot of the needle or bar b, or nearly so, and the arm B will project above or below the galvanometer-arm d and in the same direction, the springs e f being bent downwardly or upwardly to embrace the end of the arm d; but for clearness of illustration the parts are arranged as shown, and they may be so used, although the other arrangement just mentioned is preferred. The application of this apparatus to the regulation of a dynamo-electric machine is shown in Fig. 2, to which reference is now made, as well as to Fig. 1. The shaft g has secured thereto another arm, K, carrying a spring contact-piece, k, working on the vertical plates of the commutator L, connected to the sections of a resistance, R.

M is a dynamo-electric machine, from which extend conductors 8 9, having electric lamps, motors, or other translating devices, l, located in multiple-arc circuits therefrom. The coils of the galvanometer are in a multiple-arc circuit, 10 11, from 8 9, an extra resistance, R', being used or not, as desired. The magnets G H and galvanometer-arm are in a multiple-arc circuit 12 13 from 8 9, with extra resistance R². The field-circuit 14 15 of the machine is a multiple-arc circuit from 8 9, including the resistance R and the arm K'.

The operation will be understood from the foregoing description.

I do not claim herein the resistance-commutator composed of plates set on edge, since the same is covered by my application No. 78,775; nor do I claim herein the multiple-arc arrangement of the several elements, since the same is covered by my application No. 68,630; and it is to be understood that all patentable features of invention described or shown but not claimed herein are reserved for protection by other patents, and have been or will be embraced in other applications for patents.

What I claim is—

1. The apparatus for producing movement by the variations in electro-motive force of an electric current, consisting of a galvanometer affected by such current, moving contacts at which the galvanometer-arm closes circuit, and electrically-operated devices in circuit from said contacts, for moving said contacts away from said arm to break the circuit, substantially as set forth.

2. The combination, with a galvanometer, of moving contacts between which the galvanometer-arm plays, electrically-operated devices moving such contacts, and an electrical circuit including the galvanometer-arm, the moving contacts, and said electrically-operated devices, substantially as set forth.

3. The combination, with a galvanometer-arm included in an electrical circuit, of another arm following the movement of such galvanometer-arm, and electrically operated devices moving such second arm, the circuit to said electrically-operated devices being closed by the galvanometer-arm, substantially as set forth.

4. The combination, with a galvanometer-arm, of another pivoted arm, carrying on its free end insulated contacts between which the galvanometer-arm plays, two electro-magnets located in circuit with such contacts and operating pawl-levers, and oppositely-arranged ratchet-wheels worked by such pawl-levers and moving said second pivoted arm, the circuit of the electo-magnets being closed at the moving contacts by the galvanometer-arm, substantially as set forth.

5. The combination, with a dynamo-electric machine, of a regulator therefor, consisting of a galvanometer located in circuit from the machine, and closing at moving contacts local circuits to the regulator-operating devices, and to electrically operated devices for moving such contacts away from the galvanometer-arm, substantially as set forth.

6. The combination, with a dynamo or magneto electric machine, of an adjustable resistance for primarily varying the current flowing through its field-circuit, electrically-operated devices adjusting such resistance, and a galvanometer in circuit with the machine and controlling the circuits of such electrically-operated devices, substantially as set forth.

7. The combination, with a dynamo-electric machine, of translating devices located in multiple-arc circuits therefrom, the field-magnet coils of the machine, also in a multiple-arc circuit from the circuit supplied by the machine, an adjustable resistance in said field-circuit, electrically-operated devices adjusting such resistance, and a galvanometer located in a multiple-arc circuit and controlling the circuits to such electrically-operated devices, substantially as set forth.

8. The combination, with a dynamo or magneto electric machine, of the galvanometer in circuit therefrom, the pivoted arm carrying contacts controlled by the galvanometer, the electro-magnets working such arm, and the resistance adjusted by such arm, substantially as set forth.

This specification signed and witnessed this 25th day of June, 1883.

THOS. A. EDISON.

Witnesses:
H. W. SEELY,
EDWARD H. PYATT.